UNITED STATES PATENT OFFICE.

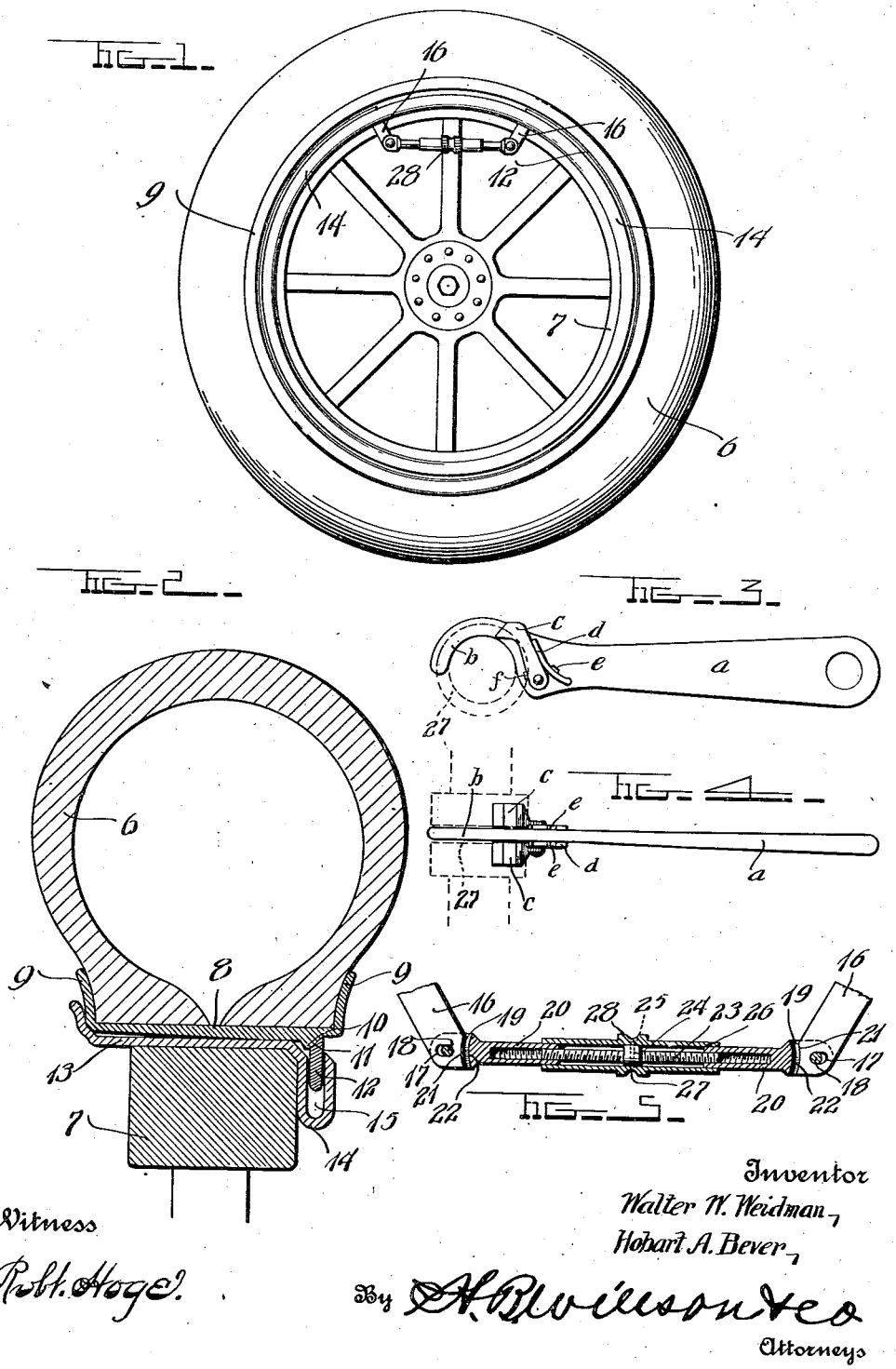

WALTER WINCHESTER WEIDMAN AND HOBART ALLON BEVER, OF HILLSBORO, INDIANA.

DEMOUNTABLE-WHEEL-RIM LOCK.

1,277,671.   Specification of Letters Patent.   Patented Sept. 3, 1918.

Application filed May 9, 1918. Serial No. 233,490.

*To all whom it may concern:*

Be it known that we, WALTER W. WEIDMAN and HOBART A. BEVER, citizens of the United States, residing at Hillsboro, in the county of Fountain and State of Indiana, have invented certain new and useful Improvements in Demountable - Wheel - Rim Locks; and we do declare the following to be a full, clear, and exact description of the invention, such as will enable others skilled in the art to which it appertains to make and use the same.

This invention relates to demountable wheel-rims, and it relates more particularly to an improved demountable wheel-rim-lock.

The main object of this invention is to generally improve upon devices of this character by providing a wheel-rim-lock in which is combined great strength, rigidity, security, self protection, convenience and practicability.

Another object is to provide a device of this character which is compact and neat, and which consists of but few and simple parts, and is, therefore, capable of being produced at a very low cost.

Other objects and advantages may become apparent to persons who read the following details of description in connection with the accompanying drawings, in which:

Figure 1 is a side elevation of a wheel comprising a rim-lock constructed in accordance with the present invention;

Fig. 2 is an enlarged radial sectional view through the tire rim, and felly, illustrating the application of one of the elements of our invention in connection with the inner and outer wheel rims;

Fig. 3 is a side elevation of a special wrench or tool for operating the rim-lock device;

Fig. 4 is a view illustrating the tool shown in Fig. 3, the line of vision being at right angles to the line of vision of Fig. 3; and Fig. 5 is a longitudinally central sectional view through the spreading device for the rim-locking annulus.

Referring to these drawings in detail, in which similar reference characters correspond with similar parts throughout the several views, the tire 6 and felly 7 are shown only for demonstrating the application of the invention. Likewise Figs. 3 and 4 are shown for the purpose of more clearly disclosing the useful features of certain elements of the invention.

The outer rim 8 is formed with any preferred form of tire-engaging flanges 9 and with an annular rib 10 which is provided with a seat 11 for a locking element 12 hereinafter described in detail. The seat or surface 11 is inclined from the outer edge portion of the rim 8 toward the center of the rim, and the circular element 12 is provided with a beveled outer edge which coöperates with the inclined surface 11 for pressing the rim 8 in its axial direction with relation to an inner rim 13 on which it is normally seated, said inner rim being secured on the felly 7 and provided with an inwardly extending channeled element 14 the channel 15 of which contains the locking element 12.

The locking element or annulus 12 is provided with radially or noncircumferentially extending end portions 16 each of which is apertured at 17 to receive a bolt or rivet 18 which extends therethrough and through the furcations 19 of a pair of internally screw-threaded spreader elements 20. The apertures or slots 17 are of greater extent than the lateral extent of the corresponding rivets or securing elements 18, so that corresponding elements 16 and 20 may have bodily movement with relation to one another so as to bring a bearing surface 21 of each element 16 against a corresponding bearing surface 22 of one of the spreader elements 20. The surfaces 21 and 22 may be suitably curved or otherwise formed so as to fit snugly one against the other when the elements 20 are spread for the purpose of spreading the elements 16 and thereby causing the annulus 12 to expand into contact with the annular rib 10 and to hold the rim 8 securely seated on the rim 13.

In order that the spreader elements 20 may be separated for the purpose previously explained, we provide an externally screw-threaded member 23 which is provided with a collar or enlargement 24 at its middle portion. This collar may be either integral with the member 23 or secured thereto by means of a pin 25 which also secures the member 23 in fixed relation to a sleeve 26 which is substantially the same length as the member 23, but has an internal diameter considerably greater than the external diameter of the screw-threaded end portions of the member 23, so as to overlap the inner ends of the substantially cylindrical inwardly extending screw-threaded portions of elements 20. It will be seen, therefore, that the sleeve 26 effectually guards and protects all of the screw-threads from the detrimental effects of extraneous matter.

The opposite ends of the member 23 are preferably provided with right-hand and left-hand threads, respectively which correspond with the internal threads of the elements 20, and it will be seen that when the sleeve 26 is rotated in one direction, the elements 20 are drawn together so as to contract and retract the annulus 12; whereas, if the sleeve 26 is rotated in the opposite direction, it moves the elements 20 from one another, and in case the annulus 12 is not immediately expanded, its expansion begins when the seats 22 have moved into contact with seat 21, and the expansion of the locking element or annulus 12 continues so long as the sleeve 26 is turning in the proper direction.

The sleeve 26 is rotatable by means of a special tool such as illustrated in Figs. 3 and 4, this tool comprising a handle a, an arcuate end b, pawl c and springs d, lugs e and f being provided for limiting movement of the pawl and springs. The body which consists of elements a and b is relatively wide and thin, so that its end portion or curved finger b may be received in an annular groove 27 which extends around the sleeve 26. At each side of the groove 27 is an annular series of teeth 28 (see Fig. 1), and these teeth are engageable by the pawls c, so that when the handle a is oscillated while the finger b is in the groove 28, each of the pawls c interchangeably meshes with the teeth 28 and coöperates therewith for rotating the sleeve 26 and thereby rotating the internally screw-threaded element 23.

From the foregoing, it will be seen that this spreading mechanism is not dependent upon comparatively weak pivotal connections, such as employed in other devices of this character, but that the shoulders or contact surfaces 21 and 22 reduce the wear and the probability of breakage to the minimum; also that the sleeve 26 not only protects the threads of the element 23, but combines with the elements 20 and 23 for forming a turn buckle or extensible link having the maximum of rigidity, strength and security.

Although we have described this embodiment of our invention very specifically, it is to be understood that our invention is not limited to these exact details of construction and arrangement of parts, but that we are entitled to make changes within the scope of the inventive idea disclosed in the foregoing description and following claims.

What we claim as our invention is:

1. A demountable wheel-rim lock comprising an expanding annulus having ends each provided with a non-circumferential extension which has an external bearing surface, a pair of threaded elements each having an end engaging with one of said extensions and having a bearing surface to normally abut against the bearing-surface of said one of the extensions, means to secure each of said extensions in engagement with the corresponding one of said threaded elements and to allow movement of the normally abutting bearing surfaces from and toward one another, and a threaded element coöperative with the said pair of threaded elements and with said bearing surfaces so as to expand and securely retain said annulus in its expanded or rim-locking condition.

2. A demountable wheel-rim lock comprising an expanding annulus having ends each provided with a non-circumferential extension which has an external bearing-surface, a pair of internally threaded elements each having a bifurcated end embracing one of said extensions and having a bearing-surface to normally abut against the bearing-surface of said one of the extensions, means to secure each of said extensions between the furcations of the corresponding one of the bifurcated ends and to allow movement of the normally abutting bearing-surfaces from and toward one another, and an externally threaded element coöperative with the internal screw-threads of said pair of internally threaded elements and with said bearing surfaces so as to expand and securely retain said annulus in its expanded or rim-locking condition.

3. A demountable wheel-rim lock comprising an expanding annulus having ends each provided with a non-circumferential extension which has an external bearing surface, a pair of internally threaded elements each having a bifurcated end embracing one of said extensions and having a bearing-surface to normally abut against the bearing-surface of said one of the extensions, means to secure each of said extensions between the furcations of the corresponding one of the bifurcated ends and allow movement of the normally abutting bearing-surfaces from and toward one another, an externally threaded element coöperative with the internal screw-threads of said pair of internally threaded elements and with said bearing surfaces so as to expand and securely retain said annulus in its expanded or rim-locking condition, and a sleeve embracing said pair of internally threaded elements and said externally threaded element.

4. A demountable wheel-rim lock comprising an expanding annulus having ends each provided with a non-circumferential extension which has an external bearing surface, a pair of internally threaded elements each having a bifurcated end embracing one of said extensions and having a bearing-surface to normally abut against the bearing-surface of said one of the extensions, means to secure each of said extensions between the furcations of the corresponding one of the bifurcated ends and to allow movement of the normally abutting bearing-surfaces from and toward one another, an externally threaded element coöperative with the internal screw-threads of said pair of internally threaded elements and with said bearing surfaces so as to expand and securely retain said annulus in its expanded or rim-locking condition, and a sleeve embracing said pair of internally threaded elements and said externally threaded element and operable to rotate the latter.

5. A demountable wheel-rim lock comprising an expanding annulus having ends each provided with a non-circumferential extension which has an external bearing surface, a pair of internally threaded elements each having a bifurcated end embracing one of said extensions and having a bearing-surface to normally abut against the bearing-surface of said one of the extensions, means to secure each of said extensions between the furcations of the corresponding one of the bifurcated ends and to allow movement of the normally abutting bearing-surfaces from and toward one another, an externally threaded element coöperative with the internal screw-threads of said pair of internally threaded elements and with said bearing surfaces so as to expand and securely retain said annulus in its expanded or rim-locking condition, and a sleeve embracing said pair of internally threaded elements and said externally threaded element and operable to rotate with the latter, said sleeve being provided with an annular groove and with an annular series of teeth adjacent to said groove, whereby the sleeve may be turned by the special tool described and shown.

In testimony whereof we have hereunto set our hands.

WALTER WINCHESTER WEIDMAN.
HOBART ALLON BEVER.